(12) United States Patent
Decaux et al.

(10) Patent No.: US 11,085,520 B2
(45) Date of Patent: Aug. 10, 2021

(54) SYSTEM FOR AXIALLY COUPLING AN ENGINE SHAFT TO A DRIVE SHAFT

(71) Applicant: Nissan Motor Co., Ltd., Yokohama (JP)

(72) Inventors: Stéphane Decaux, Rouen (FR); Emmanuel Motte, Saint Jean du Caronnay (FR)

(73) Assignee: Nissan Motor Co., Ltd., Yokohama (JP)

( * ) Notice: Subject to any disclaimer, the term of this patent is extended or adjusted under 35 U.S.C. 154(b) by 315 days.

(21) Appl. No.: 16/072,891

(22) PCT Filed: Jan. 13, 2017

(86) PCT No.: PCT/FR2017/050083
§ 371 (c)(1),
(2) Date: Jul. 26, 2018

(87) PCT Pub. No.: WO2017/129879
PCT Pub. Date: Aug. 3, 2017

(65) Prior Publication Data
US 2019/0040944 A1    Feb. 7, 2019

(30) Foreign Application Priority Data

Jan. 26, 2016   (FR) ...................................... 1650613

(51) Int. Cl.
*F16H 57/025*    (2012.01)
*B60W 10/06*    (2006.01)
(Continued)

(52) U.S. Cl.
CPC .......... *F16H 57/025* (2013.01); *B60W 10/06* (2013.01); *B60W 10/08* (2013.01); *B60W 20/10* (2013.01);
(Continued)

(58) Field of Classification Search
CPC ........ F16H 57/025; F16H 2057/02034; B60W 10/06; B60W 10/08; B60W 20/10; Y10T 74/2186; Y10T 403/7041
(Continued)

(56) References Cited

U.S. PATENT DOCUMENTS 2,726,522 A * 12/1955 Gumpper .............. F04D 29/624
464/177
2,986,956 A *  6/1961 Borsheim ............ B62D 55/135
74/606 R
(Continued)

FOREIGN PATENT DOCUMENTS

DE        4302007 C1    3/1994
EP        2631509 A1    8/2013

*Primary Examiner* — Greg Binda
(74) *Attorney, Agent, or Firm* — Global IP Counselors, LLP

(57) ABSTRACT

A coupling system is configured to axially couple a motor shaft rotating in a motor housing to a gearbox shaft rotating in a gearbox housing. The coupling system has a set screw and a socket. The set screw couples the two housings together. The socket is configured to receive the set screw. The socket being configured to can slide in a first of the motor housing and the gearbox housing in a direction of a second of the motor housing and the gearbox housing under a thrust force of the set screw during tightening thereof, in order to press the socket against the second of the motor housing and the gearbox housing at a mating surface of the second of the motor housing and the gearbox housing, so as to eliminate any play between the second of the motor housing and the gearbox housing at the mating surface.

13 Claims, 3 Drawing Sheets

(51) Int. Cl.
*B60W 10/08* (2006.01)
*B60W 20/10* (2016.01)
*F16H 57/02* (2012.01)

(52) U.S. Cl.
CPC . *F16H 2057/02034* (2013.01); *Y10T 74/2186* (2015.01); *Y10T 403/7041* (2015.01)

(58) Field of Classification Search
USPC .......................................................... 464/177
See application file for complete search history.

(56) References Cited

U.S. PATENT DOCUMENTS

| | | | | |
|---|---|---|---|---|
| 3,524,378 | A | * | 8/1970 | Wieber ............... F16B 25/0063 |
| | | | | 411/387.3 |
| 5,070,662 | A | * | 12/1991 | Niese .................... F16B 5/0004 |
| | | | | 403/362 |
| 5,501,122 | A | | 3/1996 | Leicht et al. |
| 7,527,559 | B2 | * | 5/2009 | Ikeda ..................... B60K 17/24 |
| | | | | 464/177 |

* cited by examiner

SYSTEM FOR AXIALLY COUPLING AN ENGINE SHAFT TO A DRIVE SHAFT

CROSS-REFERENCE TO RELATED APPLICATIONS

This application is a U.S. national stage application of International Application No. PCT/FR2017/050083, filed on Jan. 13, 2017, which claims priority to French Patent Application No. 1650613, filed on Jan. 26, 2016.

BACKGROUND

Field of the Invention

The invention relates to the axial coupling of a motor shaft to a transmission shaft.

SUMMARY

More precisely, the object of the invention is a system for axially coupling a motor shaft rotating in a motor housing to a gearbox shaft rotating in a gearbox housing.

The present invention also has as its object a power train of a hybrid vehicle including a suchlike coupling system.

In one particular application, but one which does not restrict the scope of the invention, the motor shaft is an output shaft of an electric motor, and the transmission shaft is an input shaft of a reduction gear, or a gearbox, coupled to the electric motor. In electric and hybrid vehicles, centering of the electric motors on their coupling face to the transmission demands perfect alignment of the shafts within the smallest possible axial section height. In order to offer a high level of performance, certain hybrid power trains (HPT) include two electric motors, of which one at least may rotate at high speed, for example up to 18,000 revolutions per minute. In order for the power of the motor to be compatible with the geometry of the coupling, it is necessary for the guiding of the shafts to be sufficiently precise to limit the residual stresses in the rotating components, to ensure the robustness of the coupling and to reduce the noise.

In such a context, the perfect axial alignment of the motor shaft and the transmission shaft during assembly of the electric motor and its reduction gear (or its gearbox) is essential. Otherwise, the coupling face of the motor will not be pressed onto the reduction gear, and play will be present between the two components. Pre-stressing of the shafts during tightening of the stitching screws of the coupling face is not achieved in these conditions.

The object of the present invention is to ensure a satisfactory coupling from the point of view of the cohesion and the integrity of the structure, with a high-speed industrial means of assembly, without the risk of noisiness or subsequent deformation.

To this end, it proposes the introduction into the coupling system of a socket for inserting a set screw for the two housings. The socket is able to slide into one of the housings in the direction of the second, under the thrust force of the screw during tightening thereof, in order to press against said second housing at a mating surface of the housings, so as to eliminate any play between the housings at this mating surface.

Preferably, the thrust force of the screw acts on the socket when the head of the screw enters into contact with said socket.

This invention permits over time:
high mechanical strength of the bearings by elimination of the residual stresses associated with their installation,
an assembly without loss of voltage, or the risk of untightening resulting in the generation of noise,
guiding of the secondary electric motor in the absence of radial stresses on the shaft of the gearbox,
effective sealing on the contact face between the motor and the box at this mating surface, and
absorption of force at the level of the set screw.

BRIEF DESCRIPTION OF THE DRAWINGS

The present invention will be better appreciated from a perusal of the following description of a non-restrictive embodiment thereof, with reference to the accompanying drawings, in which.

BRIEF DESCRIPTION OF THE DRAWINGS

Figure 1:
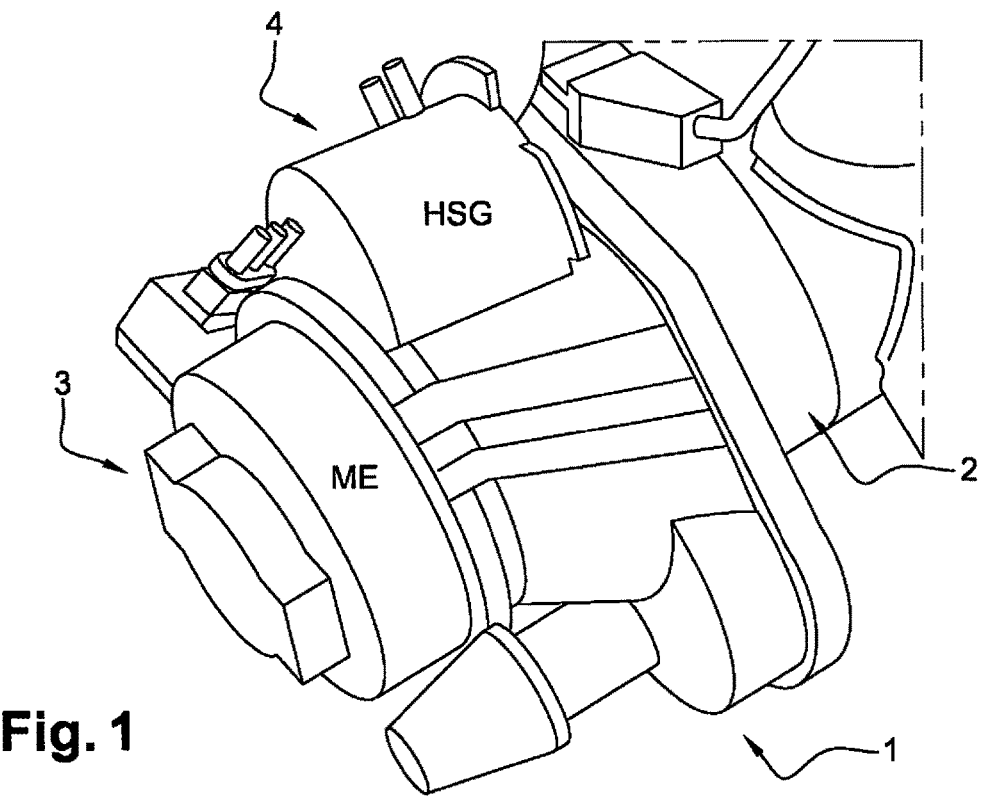
FIG. 1 is an exterior view of a hybrid power train (HPT) having a system in accordance with one embodiment.

Represented by way of non-restrictive example in FIG. 1 is a hybrid power train HPT which groups together two electric motors 3, 4 on a gearbox 1 coupled to an internal combustion engine 2, these being a principal electric motor ME (3) and a secondary electric motor (4) HSG (for "High-volt Start Generator"), of which the coupling on the gearbox presents the aforementioned problem of alignment. The partial cross section in FIG. 2 depicts the two shafts concerned, these being the output shaft 5 of the motor 4, and the input shaft 6 of the gearbox or of the reduction gear 1, with its extremity 12.

In this hybrid architecture, there is no clutch and no synchronizers. All gear changes are made under torque, thanks to an actuator. There is no starter or alternator. The second electric motor HSG, for example 400 V, performs the function of a starter-alternator, but also the synchronization of the gear changes. Lastly, it may also serve as a complement ("boost") for the principal electric motor ME. The assembly of the secondary motor 4 on the box 1 is particularly demanding, in order to be able to deliver the high torques demanded by all these functions.

Figure 2:
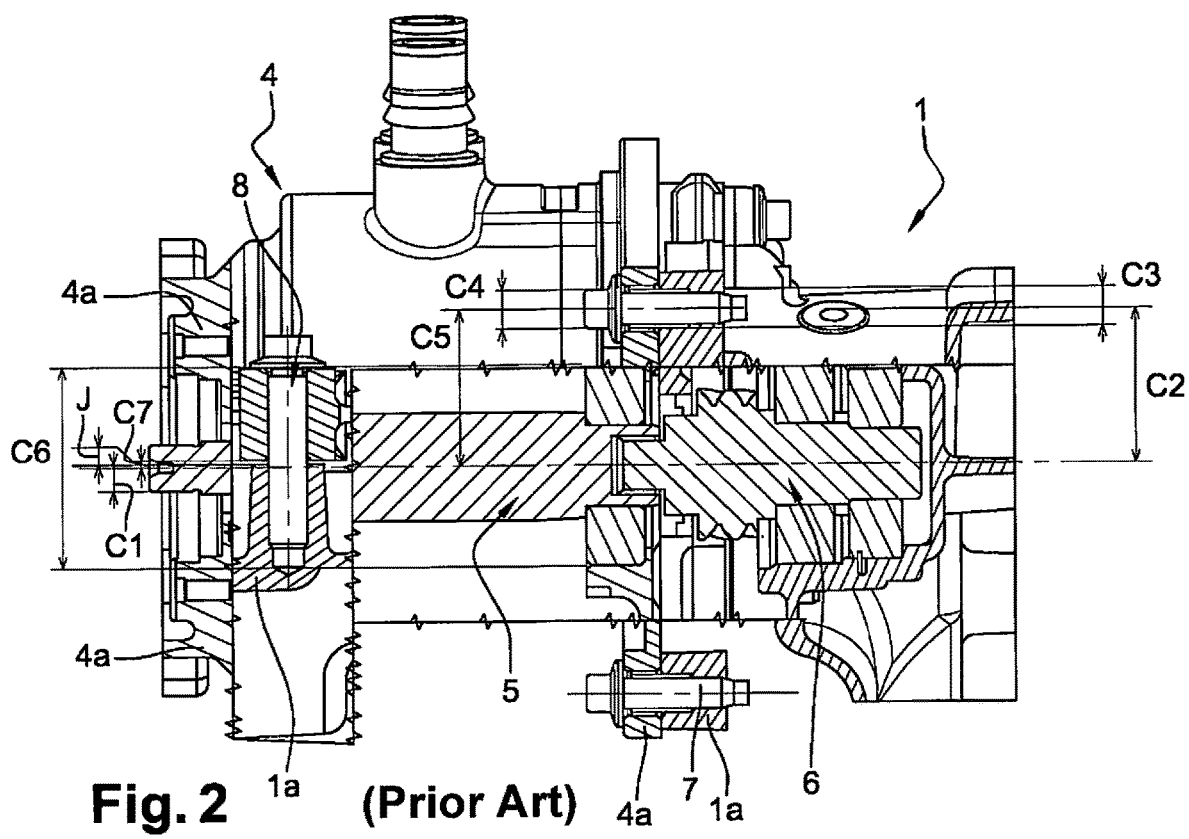
FIG. 2 is a partial cross-sectional view of a hybrid power train illustrating the state of the art.

As indicated in FIG. 2, the secondary electric motor 4 is attached to the gearbox 1 by a plurality of screws 7, these being so-called "stitching screws", which ensure its setting (plane support) on said gearbox and its centering. The gearbox shaft 6 is guided by two bearings 11, which are accommodated in the housing 1a closing the box 1. In the example in FIG. 2, the alignment of the two shafts depends on a plurality of components. The screw 8, being a so-called "set screw", ensures a different function of a torque arm between the housings 1a, and 4a, which permits micro rotation of the motor in its axis to be prevented. The set screw 8 guarantees the dynamic setting of the motor in combination with the other screws 7, in order to prevent the establishment of play J at the mating surface 13 indicated in FIG. 4. The play J results from the accumulation of seven dispersions identified in the diagram by the readings C1 to C7.

According to the indicative table below, the distribution is as follows at the level of each reading, for a total observed play J of 1.231 mm:

| Readings | Measured dispersion (mm) |
| --- | --- |
| C1 | 0.5 |
| C2 | 0.008 |
| C3 | 0.028 |
| C4 | 0.028 |
| C5 | 0.08 |
| C6 | 0.015 |
| C7 | 0.5 |
| Play J | 1.231 |

Figure 3:
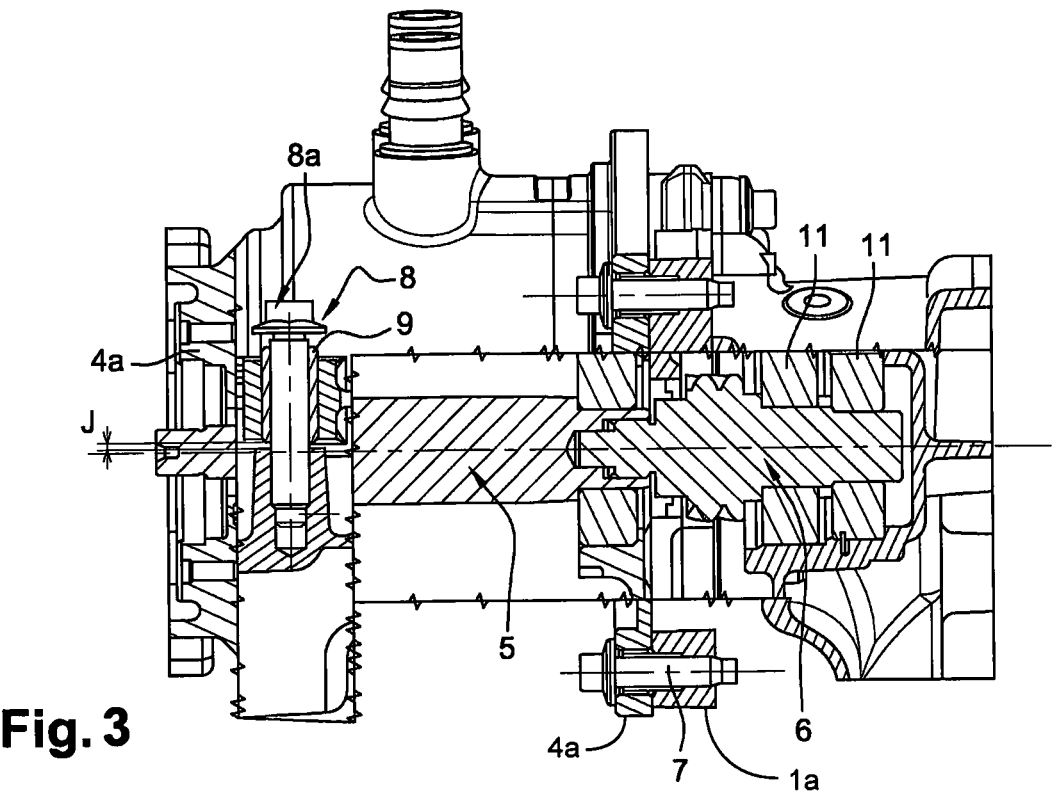
FIG. 3 is a partial cross-sectional view of a hybrid power train depicting the proposed system for coupling before final screwing.
Figure 4:
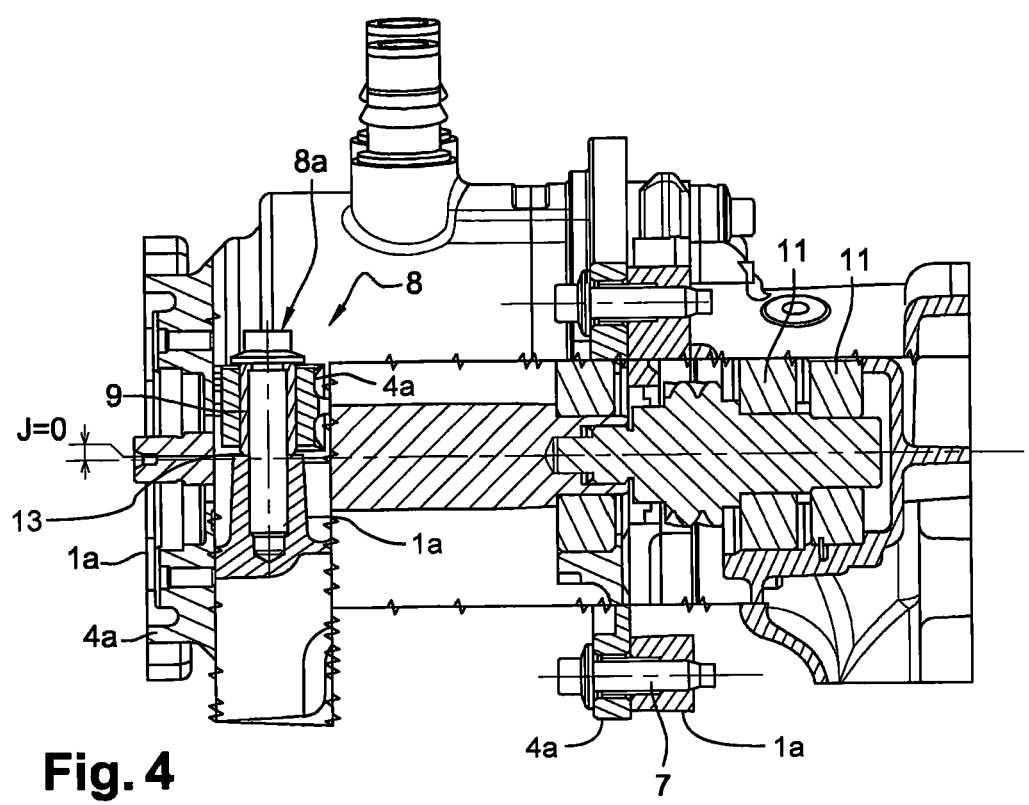
FIG. 4 is a partial cross-sectional view of the hybrid power train illustrated in FIG. 3 after final screwing.
Figure 5:
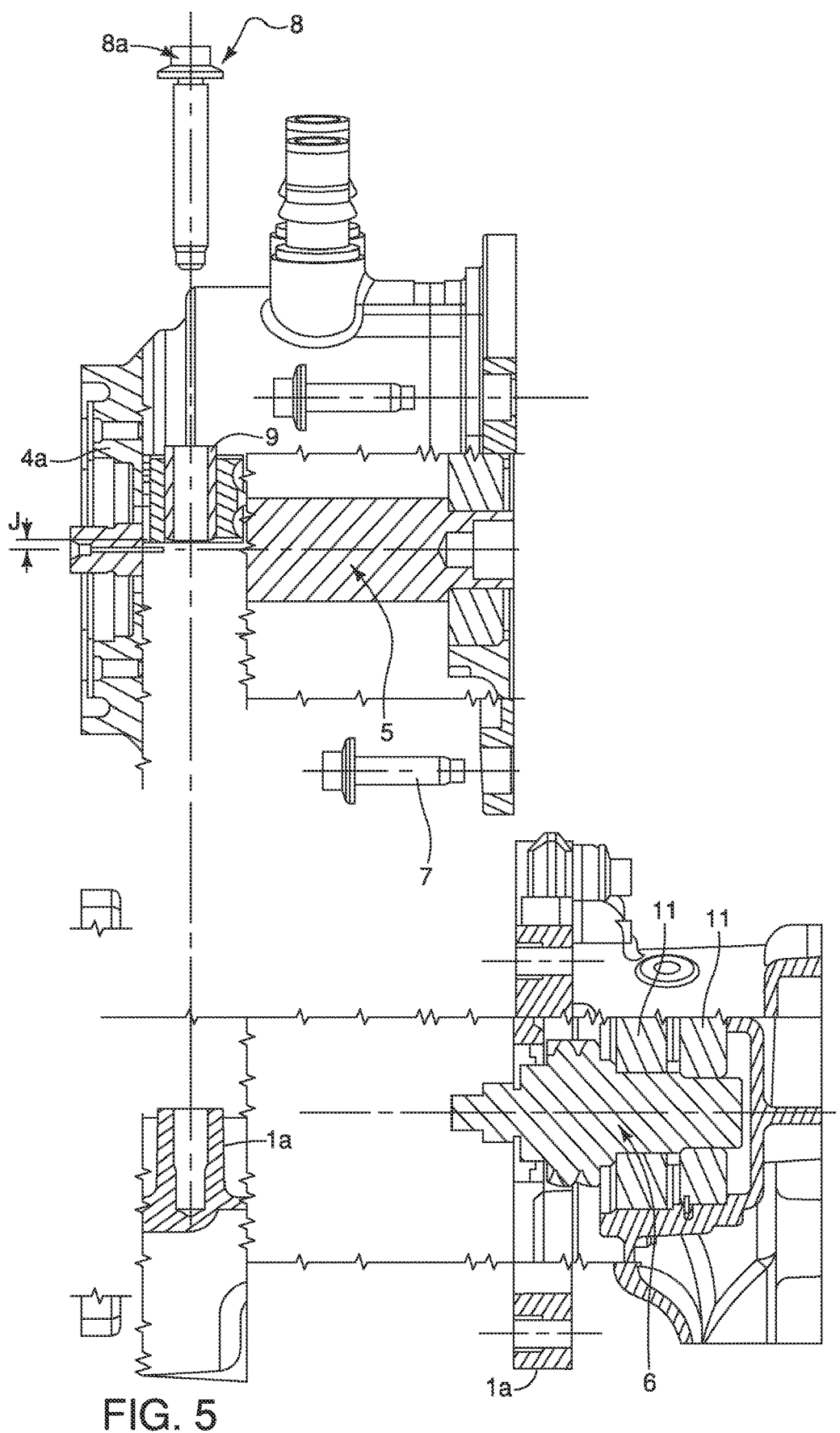
FIG. 5 is a partial cross-sectional view of the hybrid power train illustrated in FIG. 3 before connecting the motor housing to the gearbox housing.

The same general arrangement as in FIG. 2 can be found in FIGS. 3-5 depicting the invention. In accordance with the invention, however, the system for coupling the shafts 5 and 6 includes in addition an insertion socket 9. The set screw 8 and the socket 9 are oriented transversely to the mating surface of the housings 4a, 1a. The socket 9 is able to slide in one of the housings (for example the housing 4a of the electric motor 4 in the direction of the second housing (in this case, the housing 1a of the gearbox 1) under the thrust force of the set screw 8 during tightening thereof, in order to press against said second housing at a mating surface so as to eliminate any play between the housings at this level.

In this preferred embodiment of the invention, the set screw 8 is engaged in the housing 4a of the electric motor 4 through the socket 9. In FIG. 3, the play J can still be seen at the mating surface before tightening the screw 8. In FIG. 4, the play is eliminated after tightening the screw 9.

The socket 9 is slidably mounted lightly tightened in the housing 4a, which allows it to be held statically on the motor 4. During tightening of the screw 8, its head 8a enters into contact with the socket. The thrust force of the screw 8 is then exerted on said socket 9.

On the basis of the contact of the head 8a of the set screw 8 on the socket 9, the tension imposed by the head 8a of the set screw 8 is transmitted into the assembly of the housings 4a, 1a. The socket 9 is then displaced axially until the final setting for the two housings 4a, 1a (FIG. 4). The set screw 8 cooperates with the set of axial stitching screws 7. After setting of all the component parts, the tension of the set screw 8 is transmitted into the assembly of the housings 4a, 1a, according to the recommended torque.

In conclusion, the proposed assembly system is adjusted by means of the set screw 8, which at the same time assures the final setting of the housings 4a, 1a. The sliding socket 9 permits this final setting, thus eliminating any play between the housings 4a, 1a which could impair the assembly, with an associated risk of the loss of tension over time. Said assembly is assured with the assistance of the stitching screws 7. The mounting of the secondary electric motor 4 and the alignment of the shafts 5 and 6, may thus be accomplished without deforming the shaft and affecting the bearings 11 during tightening of the stitching screws 7 and the set screw 8.

Without departing from the scope of the invention, the gearbox 1 may be a multi-ratio stepped gearbox or a single-ratio reduction gear.

The power train (PT) concerned may be a hybrid power train HPT including, in addition to an internal combustion engine, a gearbox and at least one electric motor. In such a power train, the axial alignment of the output shaft 5 of the electric motor and an output shaft 6 of the gearbox 1 is assured by the system for coupling described above. This power train may, for example, include two electric motors, these being a principal electric motor and a secondary electric motor mounted on the same gearbox.

The invention claimed is:

1. A coupling system for axial coupling of a motor shaft rotatably disposed in a motor housing to a gearbox shaft rotatably disposed in a gearbox housing, the coupling system comprising:
    a set screw that couples the motor housing and the gearbox housing together; and
    a socket configured to receive the set screw, the socket being configured to slide in a first of the motor housing and the gearbox housing in a direction of a second of the motor housing and the gearbox housing under a thrust force of the set screw during tightening thereof, in order to press the socket against the second of the motor housing and the gearbox housing at a mating surface of the second of the motor housing and the gearbox housing, so as to eliminate any play between the second of the motor housing and the gearbox housing at the mating surface,
    the set screw cooperating with a set of axial stitching screws extending between the motor housing and the gearbox housing.

2. The coupling system as claimed in claim 1, wherein the thrust force of the set screw acts on the socket when a head of the set screw contacts the socket.

3. The coupling system as claimed in claim 1, wherein the motor shaft is a shaft of an electric motor.

4. The coupling system as claimed in claim 1, wherein the set screw and the socket are oriented transversely to the mating surface of the second of the motor housing and the gearbox housing.

5. The coupling system as claimed in claim 1, wherein tension of the set screw is transmitted into the motor housing and the gearbox housing after setting of the socket according to a recommended torque.

6. The coupling system as claimed in claim 1, wherein the gearbox is a single-ratio reduction gear.

7. A power train comprising the coupling system of claim 1, and the power train further comprising:
    a gearbox having the gearbox housing and the gearbox shaft; and
    at least one electric motor having the motor housing and the motor shaft.

8. The power train as claimed in claim 7, wherein the at least one electric motor includes two electric motors mounted to the gearbox.

9. The power train as claimed in claim 8, wherein the motor shaft of one of the electric motors is coupled to the gearbox shaft of the gearbox.

10. The power train as claimed in claim 7, wherein the thrust force of the set screw acts on the socket when a head of the set screw contacts the socket.

11. The power train as claimed in claim 7, wherein the set screw and the socket are oriented transversely to the mating surface of second of the motor housing and the gearbox housing.

12. The power train as claimed in claim 7, wherein tension of the set screw is transmitted into the motor housing and the gearbox housing after setting of the socket according to a recommended torque.

13. The power train as claimed in claim 7, wherein the gearbox is a single-ratio reduction gear.

\* \* \* \* \*